(12) United States Patent
Huang et al.

(10) Patent No.: US 8,144,452 B2
(45) Date of Patent: Mar. 27, 2012

(54) SUPPORTING MECHANISM AND ALL-IN-ONE COMPUTER USING THE SAME

(75) Inventors: Ri-Dong Huang, Shenzhen (CN); Jun-Jie Zheng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 176 days.

(21) Appl. No.: 12/776,515

(22) Filed: May 10, 2010

(65) Prior Publication Data
US 2011/0222231 A1    Sep. 15, 2011

(30) Foreign Application Priority Data
Mar. 12, 2010 (CN) .......................... 2010 1 0123296

(51) Int. Cl.
*G06F 1/16* (2006.01)
(52) U.S. Cl. ................................................ 361/679.02
(58) Field of Classification Search .............. 361/679.02
See application file for complete search history.

(56) References Cited

U.S. PATENT DOCUMENTS

| | | | | |
|---|---|---|---|---|
| 6,366,452 | B1 * | 4/2002 | Wang et al. | 361/679.22 |
| 6,680,843 | B2 * | 1/2004 | Farrow et al. | 361/679.02 |
| 7,180,731 | B2 * | 2/2007 | Titzler et al. | 361/679.22 |
| 7,555,581 | B2 * | 6/2009 | Martin et al. | 710/62 |
| 7,770,856 | B2 * | 8/2010 | Depay | 248/284.1 |
| 7,789,355 | B2 * | 9/2010 | Gan et al. | 248/157 |
| 7,793,897 | B2 * | 9/2010 | Wang et al. | 248/125.2 |
| 8,074,948 | B2 * | 12/2011 | Zou et al. | 248/157 |
| 2011/0026216 | A1 * | 2/2011 | Liao et al. | 361/679.35 |

* cited by examiner

*Primary Examiner* — Lisa Lea Edmonds
(74) *Attorney, Agent, or Firm* — Altis Law Group, Inc.

(57) ABSTRACT

A supporting mechanism includes a base, a supporting stand, a revolving plate, and a limiting bar. The supporting stand is fixed to the base, and defines a cavity. The revolving plate is rotatably connected to the supporting stand, and defines a guide groove. An end of the limiting bar is rotatably connected to the supporting stand, and the other end of the limiting bar is movably received in the guide groove. The cavity is sealed or opened dependent on the rotation of the revolving plate. An all-in-one computer using the supporting mechanism is also disclosed.

15 Claims, 5 Drawing Sheets

SUPPORTING MECHANISM AND ALL-IN-ONE COMPUTER USING THE SAME

BACKGROUND

1. Technical Field

The present disclosure relates generally to supporting mechanisms, particularly, to a supporting mechanism and all-in-one computer using the supporting mechanism.

2. Description of Related Art

As is well known, personal computers come in a wide variety of physical shapes and configurations ranging from a notebook computer, which compactly packages a keyboard, several operating electronics and a monitor into a single portable package, to desktop computers which may include separate computer, monitor, keyboard and speaker components gathered together with other separate computing accessories. Generally occupying a middle ground between these two computer systems is a personal computer platform/structure commonly referred to as an all-in-one computer. In this third type of computer, although a separate keyboard is required, the monitor and other electronic components, such as the motherboard, hard disk, power supply, or the like are assembled in a single housing structure, for example, a supporting mechanism for the monitor.

However, in a conventional all-in-one computer, the electronic components are secured to the supporting mechanism by a plurality of fasteners or bolts, therefore, installing or removing the electronic components is generally time-consuming and laborious.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the views.

DETAILED DESCRIPTION

Figure 1:
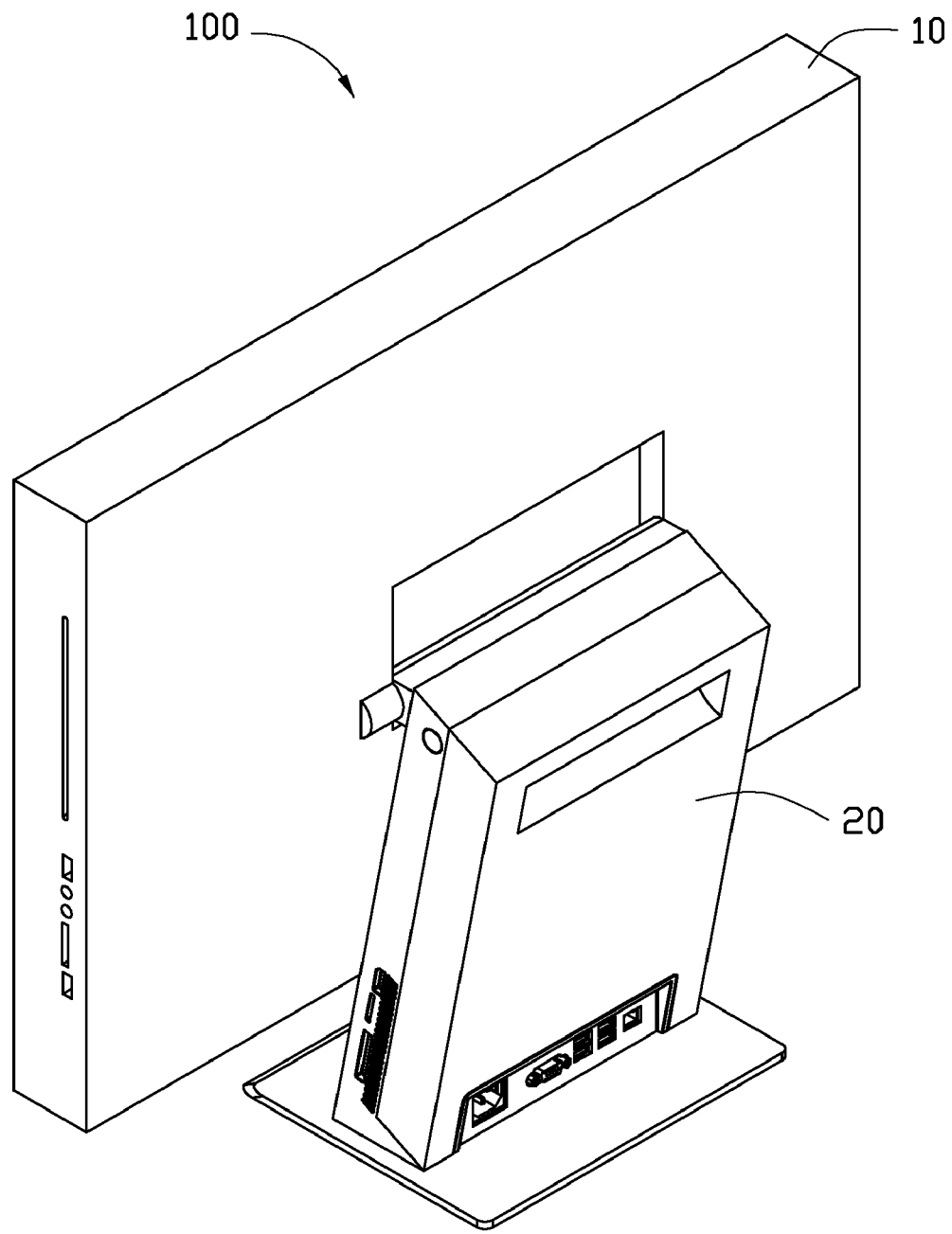
FIG. 1 is an assembled, isometric view of an embodiment of an all-in-one computer, the all-in-one computer including a supporting mechanism.

Referring to FIG. 1, an embodiment of an all-in-one computer 100 includes a monitor 10, and a supporting mechanism 20 supporting the monitor 10.

Figure 2:
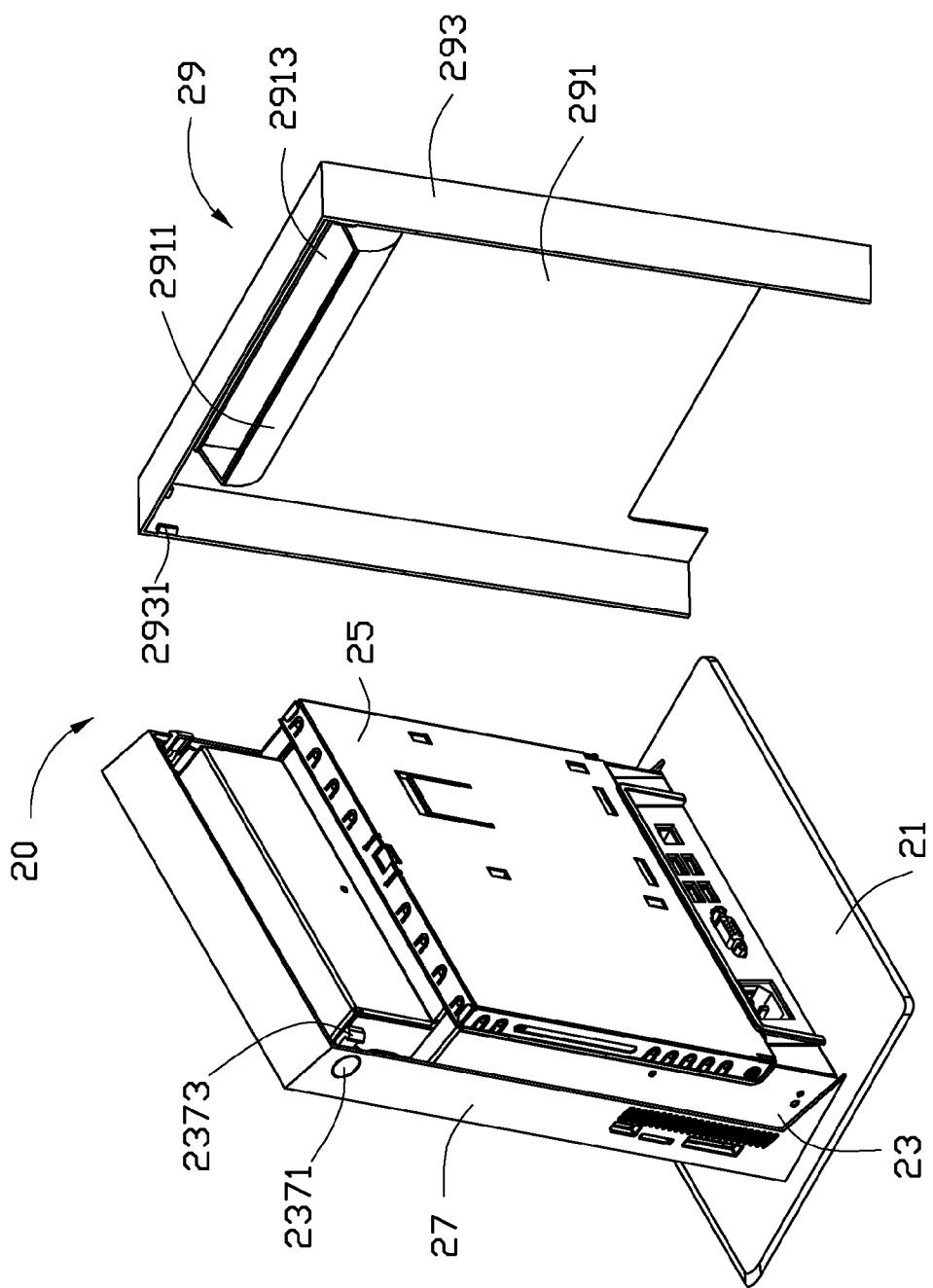
FIG. 2 is a partial, exploded, isometric view of the supporting mechanism of FIG. 1.

Referring to FIG. 2, the supporting mechanism 20 includes a base 21, a supporting stand 23, a revolving plate 25, a front plate 27, and a rear plate 29. The supporting stand 23 is fixed to the base 21. The revolving plate 25 is rotatably connected to the supporting stand 23 and positioned on a rear side of the supporting stand 23 away from the monitor 10. The front plate 27 is assembled on a front side of the supporting stand 23 near the monitor 10. The rear plate 29 is assembled on a rear side of the supporting stand 23 while facing the revolving plate 25.

Figure 3:
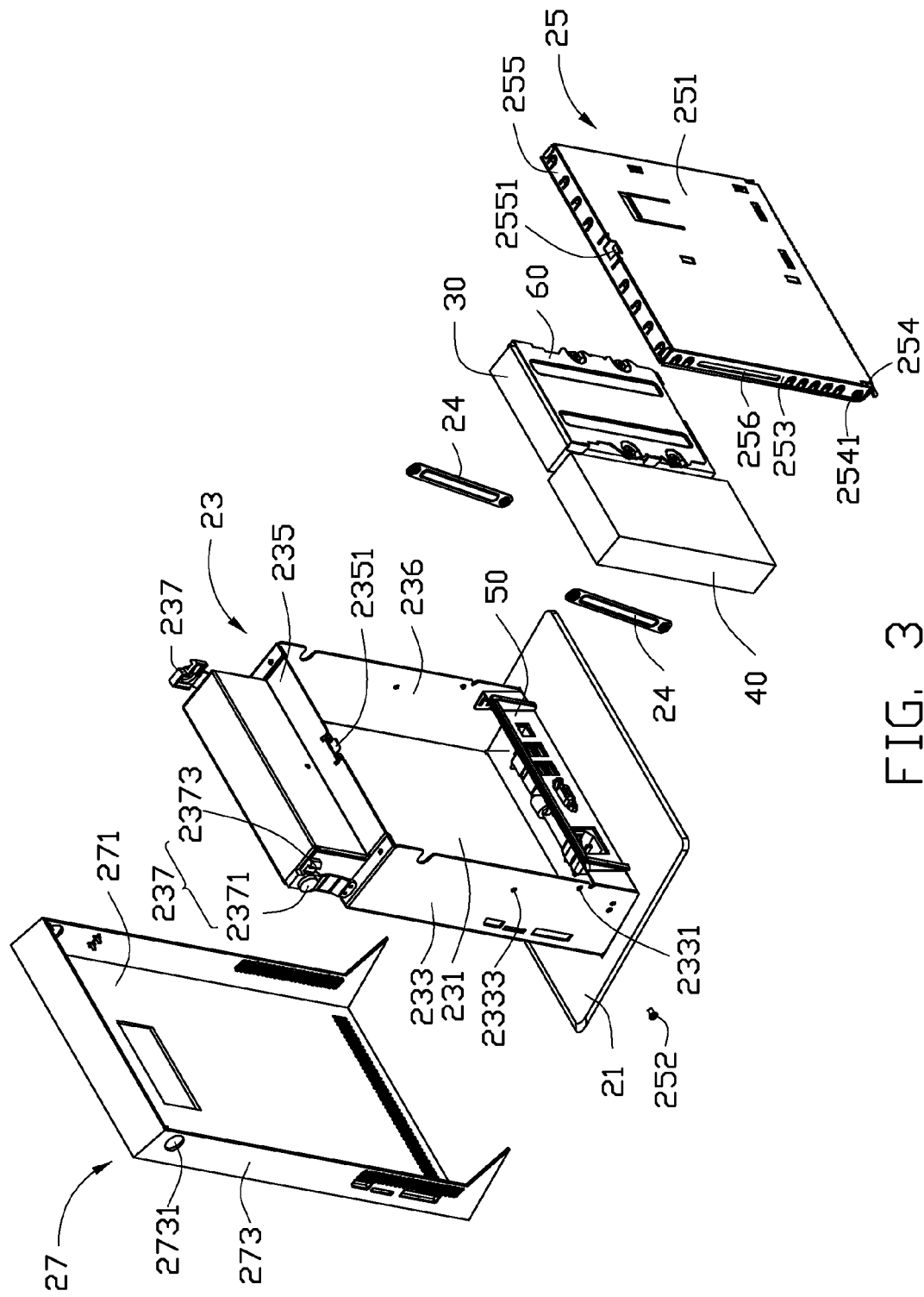
FIG. 3 is an exploded, isometric view of the supporting mechanism of FIG. 1, the supporting mechanism including a revolving plate.

Referring to FIG. 3, the base 21 is a substantially rectangular plate. The supporting stand 23 is shaped as a frame, and includes a substantially rectangular base plate 231, two side plates 233 extending substantially perpendicular to two sides of the base plate 231, and an upper plate 235 interconnecting the two side plates 233. The above plates 231, 233, 235 cooperatively define a cavity 236. The all-in-one computer 100 further includes a plurality of electronic components, such as a motherboard (not shown), a hard disk 30, a power supply 40, and a peripheral interface module 50 received in the cavity 236. The hard disk 30 and the power supply 40 are substantially rectangular and detachably mounted on the revolving plate 25 side by side. The peripheral interface module 50 is disposed adjacent to the base 21. The monitor 10, the hard disk 30, the power supply 40, and the peripheral interface module 50 are electrically connected to the motherboard via a plurality of wires (not shown).

Each side plate 233 defines a first pivot hole 2331 near a bottom end of the side plate 233, and a second pivot hole 2333 in a middle portion of the side plate 233. The supporting mechanism 20 further includes two elastic pieces 237 formed on an upper portion of each side plate 233. Each elastic piece 237 includes a fixing end fixed to the side plate 233, and a free end rotatable relative to the fixing end. The elastic piece 237 further includes a substantially round contact portion 2371 formed on the free end of the elastic piece 237, and a first retaining portion 2373 extending sideward from the free end of the elastic piece 237 adjacent to the contact portion 2371. In the illustrated embodiment, the first retaining portion 2373 is a hook.

The upper plate 235 is shaped substantially as a step plate, and forms a first latch portion 2351 on an end away from the base plate 231 to latch the revolving plate 25. In the illustrated embodiment, the first latch portion 2351 is an elastic hook.

The revolving plate 25 is shaped substantially as a rectangular housing, and includes a cover plate 251, two first bending portions 253 extending substantially perpendicular to two sides of the cover plate 251, and a second bending portion 255 interconnecting the two side plates 253. The revolving plate 25 forms two pivot portions 254, with one pivot portion 254 at one end of the first bending portion 253. Each pivot portion 254 defines a connecting hole 2541 aligned with the first pivot hole 2331. The supporting mechanism further includes two fasteners 252. Each fastener 252 passes through the connecting hole 2541 and is received in the first pivot hole 2331, such that the revolving plate 25 is rotatably connected to the two side plates 233 of the supporting stand 23 via the two pivot portions 254.

Each first bending portion 253 defines an elongated guide groove 256. The supporting mechanism further includes two limiting bars 24. One end of each limiting bar 24 is rotatably connected to the second pivot hole 2333 via a fastener (not shown), and the other end of the limiting bar 24 is slidably received in the corresponding guide groove 256.

The second bending portion 255 forms a second latch portion 2551 detachably latching with the first latch portion 2351. In the illustrated embodiment, the second latch portion 2551 is a latch hole for detachably receiving the elastic hook.

The front plate 27 is shaped as a substantially rectangular housing, and includes a main plate 271 and two bending plates 273 extending substantially perpendicular to two sides of the main plate 271. Each bending plate 273 defines a through hole 2731, which is shaped substantially as a round hole, to receive the contact portion 2371 of the elastic piece 237.

Referring to FIG. 2, the rear plate 29 is shaped as a substantially rectangular housing, and includes a main plate 291 and two bending plates 293 extending substantially perpendicular to two sides of the main plate 291. The main plate 291 forms a handle portion 2911 in the form of a depression towards the interior of the main plate 291. The handle portion 2911 defines a vent 2913 at an end to dissipate the heat produced by the electronic components. Each bending plate 293 forms a second retaining portion 2931 on an interior surface for detachably latching with the first retaining portion 2373. In the illustrated embodiment, the second retaining portion 2931 is a hook.

Figure 4:
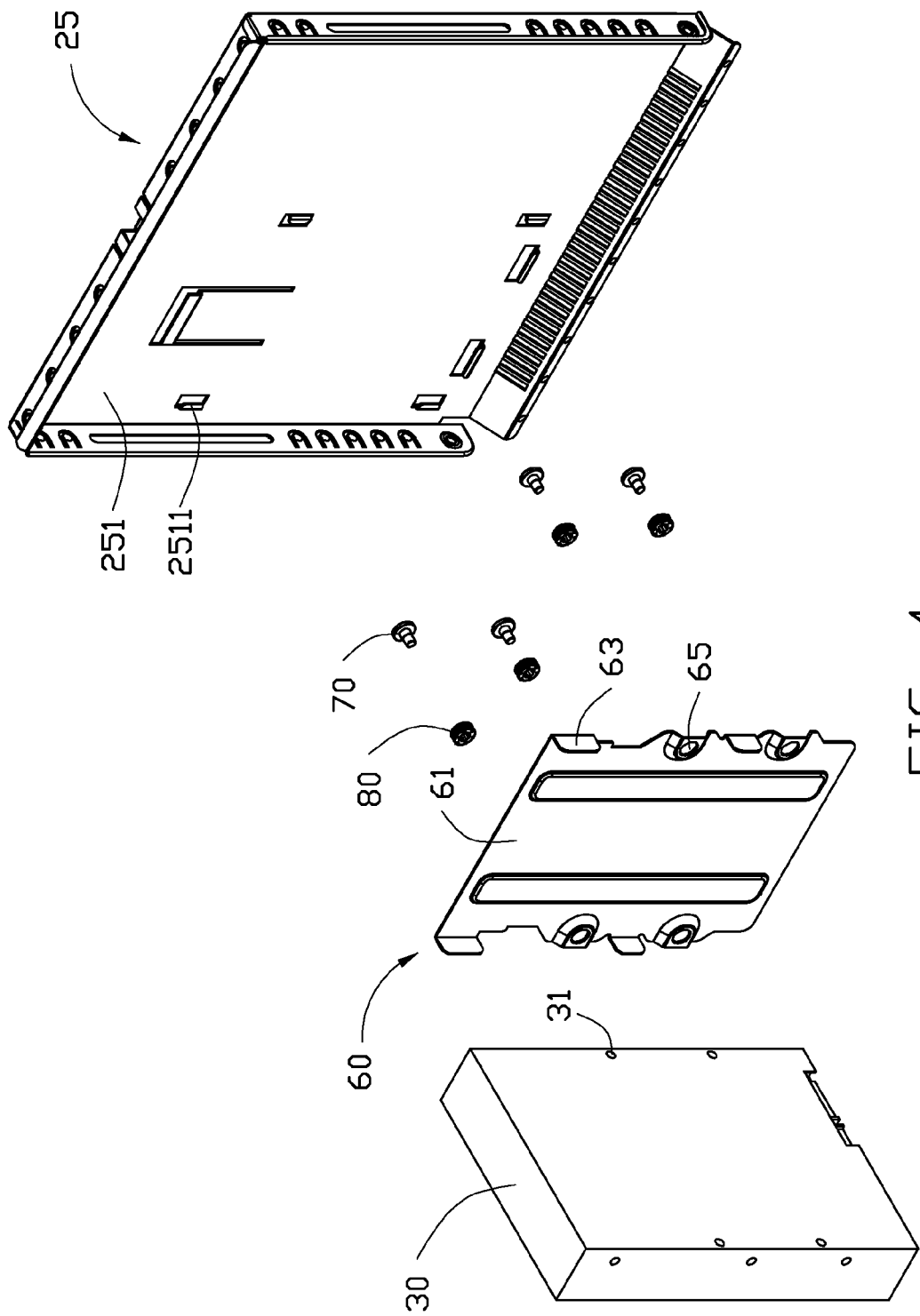
FIG. 4 is an exploded, isometric view of the revolving plate and a hard disk of FIG. 3.

Referring to FIG. 4, the all-in-one computer 100 further includes a hard disk bracket 60 to fix the hard disk 30, four fasteners 70, and four elastic washer 80. The hard disk 30 defines four fixing holes 31 on a side of the hard disk 30. The hard disk bracket 60 is shaped as a substantially rectangular plate having the same size of the hard disk 30. The hard disk bracket 60 includes a fixing plate 61 and four bending portions 63 extending substantially perpendicular to two sides of the fixing plate 61. The hard disk 30 is located between the four bending portions 63. The fixing plate 61 defines four positioning holes 65 aligned with the four fixing holes 31 of the hard disk 30. Four elastic washers 80, which are made of rubber or the like, are positioned inside the four positioning holes 65, respectively. Four fasteners 70 pass through the four elastic washers 80, and engage the four fixing holes 31, such that the hard disk 30 is fixed to the hard disk bracket 60. The elastic washer 80 is capable of absorbing shock from exterior so as to improve the working stability of the hard disk 30. The cover plate 251 of the revolving plate 25 forms a plurality of fastening portions 2511 to slidably receive two opposite rims of the fixing plate 61 of the hard disk bracket 60. In the illustrated embodiment, the fastening portion 2511 is formed as a bending hook.

Figure 5:
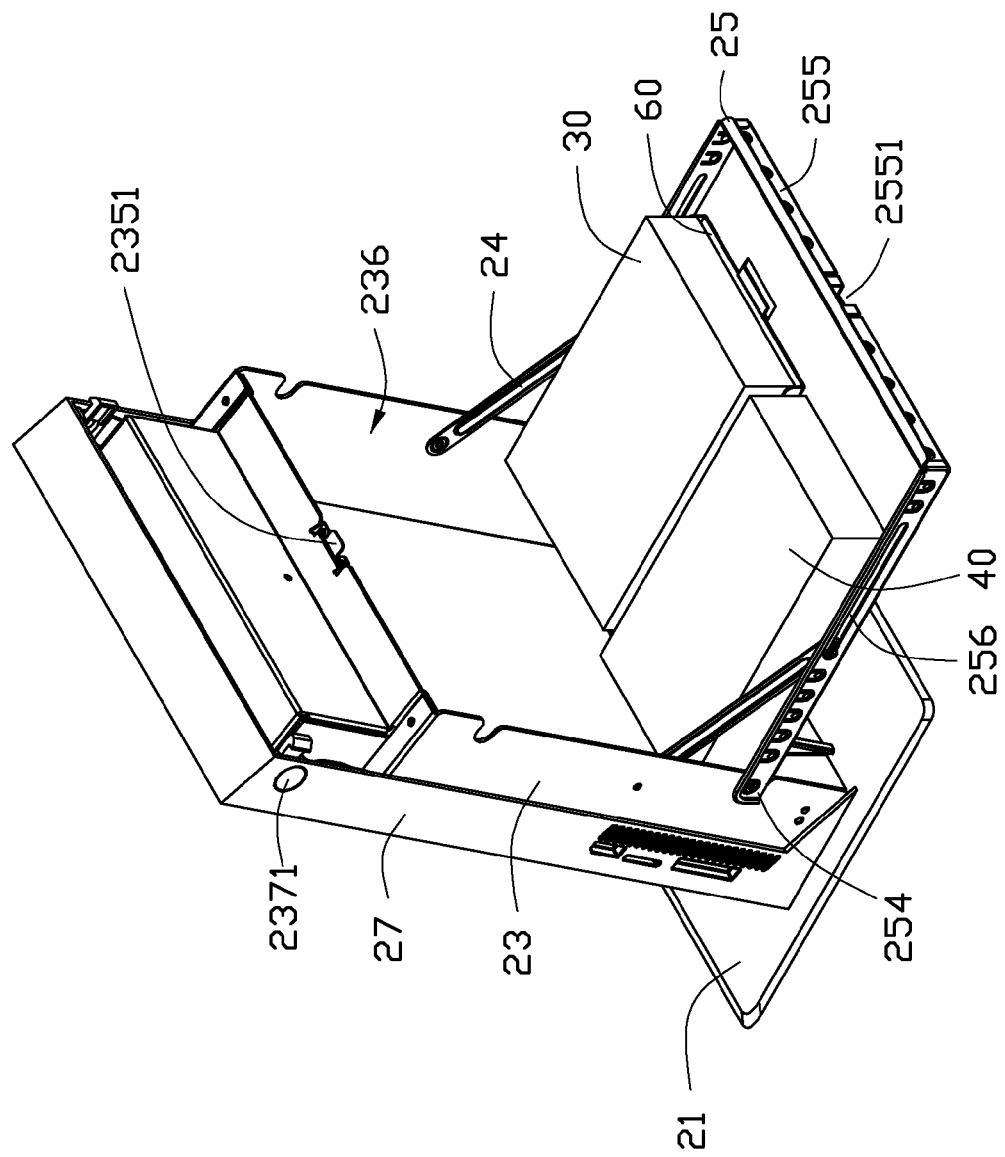
FIG. 5 is similar to FIG. 2, but shows the supporting mechanism in disassembly.

Referring to FIG. 2 and FIG. 5, when the hard disk 30 is to be disassemble from the supporting mechanism 20, the rear plate 29 is dismounted from the supporting stand 23 by pushing two contact portions 2371, simultaneously, so as to detach the second retaining portion 2931 from the first retaining portion 2373. The first latch portion 2351 is moved to detach from the second latch portion 2551, and the second bending portion 255 is moved to rotate the revolving plate 25 about the two pivot portions 254 relative to the supporting stand 23. At the same time, one end of the limiting bar 24 rotates relative to the supporting stand 23, and the other end of the limiting bar 24 slides in the guide groove 256. When the other end of the limiting bar 24 resists an end of the guide groove 256, the revolving plate 25 is stopped and remains in a position substantially parallel to the base 21. The cavity 236 is then opened, and the hard disk 30, as well as the hard disk bracket 60, can be easily disassembled from the revolving plate 25. It is to be understood that the motherboard, the power supply 40, and other electronic components can also be taken out of the cavity 236. When the hard disk 30 is disassembled, the second bending portion 255 is moved again to rotate the revolving plate 25 in a reverse direction with respect to the supporting stand 23 to seal the cavity 236.

It is to be understood that the first latch portion 2351, the second latch portion 2551, the first retaining portion 2373, and the second retaining portion 2931 are not limited to the hooks or holes as described. The front plate 27, the rear plate 29, the elastic piece 237, the hard disk bracket 60, and the peripheral interface module 50 may be omitted.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A supporting mechanism, comprising:
   a base;
   a supporting stand fixed to the base, and defining a cavity;
   a revolving plate rotatably connected to the supporting stand, and defining a guide groove; and
   a limiting bar, an end of which rotatably connects to the supporting stand, and the other end is movably received in the guide groove;
   wherein the cavity is sealed or opened dependent on the rotation of the revolving plate.

2. The supporting mechanism of claim 1, wherein the supporting stand comprises a base plate and a plurality of side plates extending outwards from the opposite sides of the base plate; the revolving plate comprises a cover plate and two first bending portions extending outwards from the opposite sides of the cover plate, each first bending portion rotatably connected to the corresponding side plate.

3. The supporting mechanism of claim 2, wherein the revolving plate further comprises two pivot portions at an end of each first bending portion, and is rotatably connected to the two side plates via the two pivot portions.

4. The supporting mechanism of claim 2, wherein an end of the limiting bar is rotatably connected to one of the two side plates and the guide groove is defined on the first bending portion.

5. The supporting mechanism of claim 2, wherein the supporting stand further comprises an upper plate interconnecting the two side plates, the upper plate comprising a first latch portion; and the revolving plate comprises a second latch portion detachably latching with the first latch portion of the upper plate.

6. The supporting mechanism of claim 5, wherein the first latch portion is an elastic hook, and the second latch portion is a latch hole for detachably receiving the elastic hook.

7. The supporting mechanism of claim 1, further comprises a rear plate assembled on a side of the supporting stand facing the revolving plate, the supporting stand forms a first retaining portion and the rear plate forms a second retaining portion detachably latching with the first retaining portion.

8. The supporting mechanism of claim 7, further comprising an elastic piece formed on the supporting stand, the elastic piece comprising a contact portion at an end, and the first retaining portion is formed on the elastic piece adjacent to the contact portion.

9. The supporting mechanism of claim 8, further comprises a front plate assembled on a side of the supporting stand away from the revolving plate, the front plate defining a through hole to receive the contact portion.

10. The supporting mechanism of claim 7, wherein the rear plate comprises a handle portion formed on a surface thereof, and the handle portion defining a vent to dissipate heat.

11. An all-in-one computer, comprising:
    a hard disk;
    a monitor;
    a supporting mechanism supporting the monitor; the supporting mechanism comprising:
      a base;
      a supporting stand fixed to the base and connected to the monitor, the supporting stand defining a cavity to receive the hard disk;
      a revolving plate rotatably connected to the supporting stand, and defining a guide groove; and
      a limiting bar, an end of which rotatably connects to the supporting stand, and the other end movably received in the guide groove;

wherein the hard disk is detachably mounted on the revolving plate, and the cavity is sealed or opened dependent on the rotation of the revolving plate.

12. The all-in-one computer of claim 11, further comprising a hard disk bracket fixed to the hard disk, and the revolving plate forms a plurality of fastening portions to slidably receive the hard disk bracket.

13. The all-in-one computer of claim 12, wherein the hard disk defines a plurality of fixing holes, the hard disk bracket defines a plurality of positioning holes aligned with the fixing holes, respectively; and the all-in-one computer further comprises a plurality of elastic washers positioned inside the positioning holes, respectively, and a plurality of fasteners received in the fixing holes after passing through the elastic washers.

14. The all-in-one computer of claim 11, further comprising a power supply detachably received in the cavity.

15. The all-in-one computer of claim 11, further comprising a peripheral interface module received in the cavity.

\* \* \* \* \*